United States Patent

[11] 3,573,626

[72] Inventor Robert J. Ertman
 Monroe County, N.Y.
[21] Appl. No. 717,124
[22] Filed Mar. 29, 1968
[45] Patented Apr. 6, 1971
[73] Assignee General Dynamics Corporation

[54] AUTOMATIC RADIO FREQUENCY PULSE MEASUREMENT SYSTEM
 12 Claims, 3 Drawing Figs.
[52] U.S. Cl........................................ 325/67,
 325/133, 325/363
[51] Int. Cl........................................ H04b 1/16
[50] Field of Search............................ 325/67,
 133, 363; 324/77; 179/1 (AS), 15.55

[56] References Cited
 UNITED STATES PATENTS
| | | | | |
|---|---|---|---|---|
| 2,967,998 | 1/1961 | Hurvitz | | 324/77 |
| 2,973,478 | 2/1961 | Hurvitz | | 324/77 |
| 3,403,227 | 9/1968 | Malm | | 179/15.55 |

Primary Examiner—Robert L. Griffin
Assistant Examiner—Kenneth W. Weinstein
Attorney—Martin Lu Kacher ABSTRACT: The microwave pulse signal measurement system described herein automatically derives the Fourier power spectrum of a microwave pulse train from a unit under test and simultaneously measures the frequency at which the microwave pulses have their maximum power. The input microwave pulses are mixed with local signals generated in a microwave synthesizer which is controlled by a programmer to change the frequencies of the local signals in discrete steps. The intermediate frequency burst obtained from the mixer upon occurrence of each microwave pulse is sampled and translated into digital information. A Fourier transform computer obtains from this digital information, output information as to the power density of different frequency components across the spectrum of the microwave pulse. This digital information can be displayed on an oscilloscope or a plotter to provide a visual presentation of the power spectrum of the microwave pulse. The computer outputs are also translated into digital outputs corresponding to the Fourier component having maximum power. These digital outputs may be subtracted from digital outputs obtained from the synthesizer which represent the frequency of the local signals to produce a number directly indicating the frequency at which the microwave pulse has its maximum power.

INVENTOR
ROBERT J. ERTMAN

AUTOMATIC RADIO FREQUENCY PULSE MEASUREMENT SYSTEM

The present invention relates to electronic instrumentation systems and particularly to a system for measuring and displaying the power spectrum and frequency of microwave pulses, and if desired, simultaneously measuring and displaying both the frequency and spectrum.

While the invention is especially suitable for use in electronic test equipment for checking out and analyzing radar and other microwave pulse equipment, it will also have application to any system where the frequency and/or spectrum of radio frequency energy is desired.

In view of the complexity of electronic equipment, it has become desirable to provide automatic and particularly computer controlled testing apparatus. The measurement of pulsed carrier radio frequency signals, such as the microwave signals which are produced in radar apparatus, has not been amenable to computer controlled automatic testing. In order for the power spectrum and frequency of such pulses to be determined, it has been necessary to manually and separately operate panoramic analyzers and transfer oscillator electronic counters to which the pulses are applied. While systems have been developed for measuring manually the frequency of pulsed continuous wave signals in a manner to display directly a digital readout of the frequency of such signals (see my U.S. Pat. No. 3,244,983 issued Apr. 5, 1966 for "Continuously Tunable Direct Reading High Frequency Converter"), there are no known means for automatic simultaneous direct readout of accurate information respecting both the spectrum and the frequency of a radio frequency pulse, inasmuch as these frequency measurement techniques are not capable of indicating either the power spectrum of the pulse or the frequency at which the pulse has its maximum power.

Accordingly, it is an object of the present invention to provide improved automatic electronic test equipment which is adapted to be operated under computer control.

It is another object of the present invention to provide an improved programmable spectrum analyzer for microwave and other radio frequency pulse signals.

It is a further object of the present invention to provide an improved system for direct measurement of the frequency at which a microwave pulse has its maximum power.

It is a still further object of the present invention to provide an improved system for measuring, simultaneously, the power spectrum power density (power per unit bandwidth) and the frequency of RF pulse signals, such as microwave pulses.

It is a still further object of the present invention to provide an improved system for measurement of the peak power of RF pulse signals, as well as the average power of such signals over a specified bandwidth which such signals can occupy.

It is a still further object of the present invention to provide an improved system for measurement of long term (viz. several minutes) and/or short term (viz. about 1 second) frequency stability of RF pulse signals.

Briefly described, a radio frequency pulse signal measurement system embodying the invention derives information as to the frequency at which the power of the power spectrum of a microwave pulse is a maximum. This is accomplished by means for measuring the power spectrum of the pulse over successive frequency increments across the frequency spectrum where the pulse has its energy. Means are provided for detecting the spectrum power in each such increment of the spectral bandwidth of the pulse by digital Fourier analysis thereof, thereby providing the frequency at which the spectral power density in each such increment is a maximum. Logic means are also provided for determining which of such frequencies, which has the maximum power density in its own increment, corresponds to a maximum power spectral density over the entire frequency spectrum of the microwave pulse. The digital information respecting this frequency may be read out directly, thereby indicating the frequency at which the microwave pulse has its maximum power. Specifically, impulses in the form of bursts amenable to analog-to-digital conversion and application to a Fourier transform computer are provided by means of a mixer (down-converter) to which the microwave pulses are applied as a first input, and to which local signals from a programmable microwave synthesizer are applied as a second input. The synthesizer is adaptable to external computer control. Digital information from a programmer which may be operated by the external computer or from an input-output device, such as a tape reader causes the microwave synthesizer to produce local signals at successive frequency steps across the spectral response of the microwave pulse. The outputs from the Fourier transform computer represent, in digital form, the frequency, phase, and power of the Fourier components in each frequency increment across the spectral response of the microwave pulse which corresponds to each frequency step. These digital outputs may be converted into analog form and displayed on a cathode ray oscilloscope or plotter which traces the spectral response of the microwave pulse. The digital outputs which correspond to the frequency of the Fourier component having the maximum power in each increment may be also applied to a logic network which determines the one of such components which represents a frequency having the maximum power across the entire spectral bandwidth of the pulse. The digital output may be subtracted from an input derived from the microwave synthesizer which indicates in digital form the frequency of the local signals. The digital number resulting from the subtraction will be a direct readout of the frequency of the microwave pulse at which that pulse has its maximum power.

The invention itself, both as to its organization and method of operation, as well as additional objects and advantages thereof will become more readily apparent from a reading of the following description in connection with the accompanying drawings in which.

Figure 1:
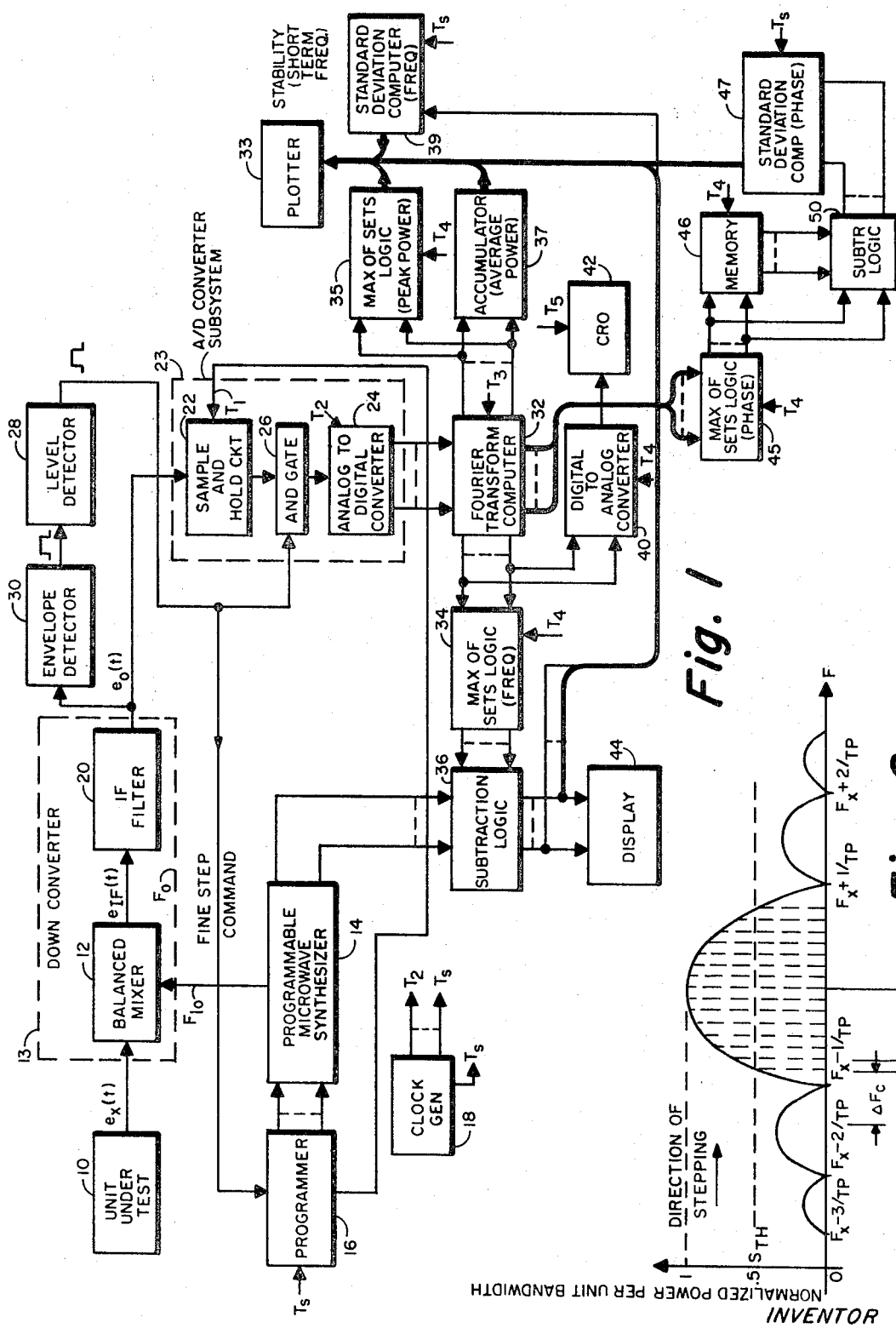
FIG. 1 is a block diagram of a microwave pulse measurement system embodying the invention.
Figure 2:
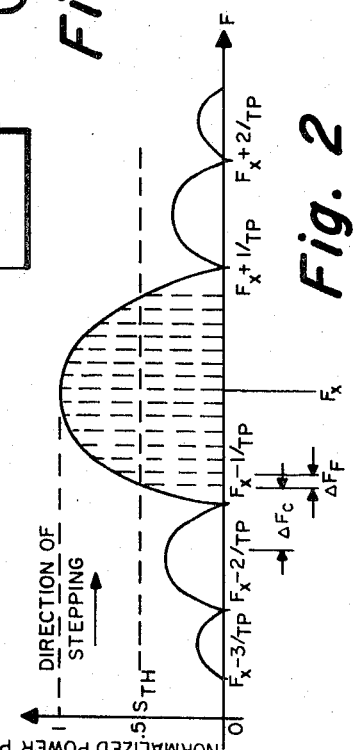
FIG. 2 is a graph showing the spectral response of a microwave pulse which is to be measured by means of the system shown in FIG. 1.

The unit under test 10 may be a radar set which produces microwave pulses having a pulse width $TP$. The pulses may be repetitive at any frequency, either regularly or at random. The spectral response of such a pulse can extend across a considerable frequency band about its normal frequency, $F_x$ as shown in FIG. 2. Thus, for a rectangular pulse, for example the main lobe of the spectral response may extend above the below $f_x$ by frequencies equal to the reciprocal of the pulse width ($TP$).

In order to examine each frequency increment of the spectral response, it is necessary to isolate each such increment of this response. To this end, the signals from the unit under test 10 are applied to a balanced mixer 12 of a down-converter 13 together with local signals from a programmable, stepped frequency microwave synthesizer 14. Such synthesizers are available in the trade. The synthesizer model 700A sold by Frequency Engineering Laboratories of Farmingdale, N.J. may be suitable. This synthesizer provides output frequencies in coarse steps of approximately 100 kHz. and fine steps of approximately 10 kHz. over a frequency range from about 1 GHz. to 2.4 GHz. Other microwave synthesizers having different frequency ranges may be used, for example, the microwave synthesizers sold by Watkins-Johnson of Palo Alto, California, e.g. their model WH–1074.

A programmer 16, such as a computer or a tape reader, controls the synthesizer to step over the requisite frequencies, either in fine or coarse steps, and to start and cover only the frequency range of interest. The frequency range of interest is under most circumstances available, a priori, from the specifications of the radar under test. This information can therefore be entered on the tape or otherwise programmed in the computer and the programmer operated so as to efficiently cover the band of interest in a minimum amount of time. The programmer and all of the other sequential units in the systems are operated by a common clock from a clock generator 18. The clock pulses from this generator are provided and are indicated as being $t_2$ to $T_s$. These pulses have different rates, but are all synchronous, being derived from a common standard or source.

The output of the down converter 13 will be a pulse which occurs during the time that the microwave pulse is produced by the unit under test. An intermediate frequency filter 20 in the converter 13, which desirably has a bandwidth not more than two times the reciprocal of the pulse width of the microwave pulses, will permit passage of intermediate frequency signals corresponding to each successive oscillator step across the spectral response of the microwave pulses. The intermediate frequency impulses are translated into digital form by means of an analog-to-digital conversion subsystem. In the subsystem, an analog AND gate 26 is connected between a sample- and-hold circuit 22 and an analog-to-digital converter 24. The AND gate 26 prevents the determination of the spectral response and frequency of the microwave pulse until the intermediate frequency impulses are in the range of interest. The analogue AND gate 26 receives a command from a power level detector 28 which produces an output level for enabling the AND gate 26 when the amplitude of the envelope of the $IF$ impulses as derived by a power envelope detector 30 (viz. containing a square law device, such as a diode having a square law characteristic) is above a certain threshold. This threshold is indicated as $S_{TH}$ in FIG. 2. This threshold is set at a point near the on-set of the main lobe and above the first side lobe of the special response to prevent stopping on the side lobes. The output of the level detector is also utilized as a fine step command to the programmer 16. Initially, the programmer operates the programmable microwave synthesizer to step across the expected spectral response of the microwave pulses in coarse steps, such as indicated by $\Delta F_c$ in FIG. 2. When the fine step command is given by the level detector 28, the programmer is conditioned to cause the synthesizer 14 to step in relatively fine steps, such as indicated by $\Delta f_f$ in FIG. 2. When the synthesizer has fine stepped across the frequency range of the main lobe and the input to the level detector drops below the threshold, the synthesizer again steps in relatively coarse steps. As many reiterations or movements through the spectral range as is desired may be provided by the programmer 16.

The sample-and-hold circuit 22 samples the cycles of the intermediate frequency impulses at the initiation of five stepping and holds each sample during each step so as to permit the analog-to-digital converter 24 to convert each $IF$ impulse into digital form at a sampling rate equal to the Nyquist rate. For example, with a maximum $IF$ of 25 mHz. the sampling rate must at least be 50 mHz. As the samples are taken very rapidly at the Nyquist rate, there will be two samples for each cycle of the highest $IF$ frequency of 25 mHz. having a period of 0.04 microsecond. For a pulse width of 0.5 microsecond, there will be 12 cycles, thus 24 samples are provided for each intermediate frequency impulse. Specifically, for an $IF$ center frequency of 23 mHz., the maximum stepping rate should be 2.67 mHz. per second, and the maximum scanning time for traversing the main lobe of the spectrum will be ½seconds. These relationships may be expressed in general form by the equations set forth in the following table:

$IF$ pulse width $\tau = RF$ pulse width $TP$

Period of 1 cycle of $IF$ $$T = \frac{1}{f_{IF}}$$

Nyquist sampling period $$T_s = \frac{1}{\text{Nyquist rate}}$$

Number of samples $$N_s = \frac{\tau}{T_s}$$

$IF$ filter center frequency $$f_0 = f_{IF\,max} - \frac{1}{\tau}$$

Scanning rate max $= \frac{2}{3}(2/\tau)$ $$\text{Scanning time min.} = \frac{2/\tau}{\text{Scan Rate max.}}$$

Number of fine frequency increments $$N_f = \frac{2}{\tau \Delta F_f}$$

band-pass filter bandwidth (½power)

$$B_0 \leq \frac{2}{\tau}$$

Relative Threshold power level setting relative to main lobe $$S_{TH} db = 10 \log \frac{\sin\,(3/2\tau)}{(3/2\tau)}$$

Reference may be had to chapter 8 Spectrum Analyzers, of the book "The Fourier Integral and Its Applications" by A. Papoulis, published by McGraw-Hill, copyright 1962, pp. 144 to 160, for the mathematical derivations of the maximum scanning rate and the filter output amplitude and phase as a function of the difference in frequency between the down-converted unknown signal frequency $f_{IF}$ and the known filter $IF$ center frequency $f_0$.

The time sampled information contains both amplitude and frequency information of the $IF$ impulses (viz. each increment of frequency produced by the synthesizer 14) to permit a discrete Fourier transform (DFT) power spectrum computation using the fast Fourier transform (FFT) algorithm to rapidly compute the DFT of the discrete data samples of each $IF$ pulse. This sampled information $x_p(t)$ of the filter output $x(t)$ may be expressed by the following discrete Fourier series:

$$x_D(t) = \sum_{n=-\infty}^{n=\infty} \left[ \frac{1}{2T} X\left(\frac{n}{2T}\right) \right] e^{j2\pi \left(\frac{n}{2T}\right) t}$$

where $x_p(t)$ represents the amplitude of the sampled signal, $1/2T$ the sampling rate, and $$X\left(\frac{n}{2T}\right)$$

represents the transform of each of the samples, and $n$ is the order of the Fourier coefficient. Reference may be had to a technical report published by the Institute of Electrical and Electronic Engineers (IEEE No. 265 "Burst Measurements in the Frequency Domain," Feb. 1966, p. 19) for greater detail respecting this Fourier transform. These digital numbers are applied to Fourier transform (FFT) computer 32 which provides output digital information respecting the amplitude of the fundamental and other frequency components of the power spectrum of each intermediate frequency impulse. The fundamental will, of course, correspond to the center frequency of the bandwidth of each intermediate frequency impulse which is applied to the sample-and-hold circuit 22 and the analog-to-digital converter 24. The design of the FFT computer 32 is presented in greater detail in an article appearing in "Electronic Design" magazine for Dec. 6, 1967 (pp. 25-—30). A general purpose digital computer, such as the IBM system 360, may also be programmed to utilize digital information to derive the Fourier spectrum components. The programming for such a computer is described in the programming manual published by IBM, No. H–20–0205-2 and available from IBM, Endicott, New York. This manual was copyrighted in 1966 and 1967. The subroutine package is identified in the manual as No. 360A–CM–XS version II. Reference may also be had to an article which appeared in the Proceedings of the IEEE, Vol. 55, No. 10, Oct. 1967 for further information respecting the operation of the FFT computer. Briefly, the program solves the algorithm set forth below which appears on p. 148 of the manual:

$$X(j) = \sum_{k=0}^{k=n-1} A(k) w^{ik}$$

where $\chi(j)$ is the complex Fourier transform of complex numbers $A(k)$; $\omega$ is $e^{2\pi i^{iN}}$; $N$ is $2^M$; $M$ is the desired order of the Fourier coefficients where $0\ M\ N$; $(2N\ 1)$ is the number of samples; $i$ is $-1$; $j$ indicates the complex Fourier transform operator.

The output of the Fourier transform computer which represents the fundamental frequencies of each frequency increment of the spectral response of the pulse is derived by a maximum of set logic system 34. This system identifies the digital number of all of the numbers which come out of the transform computer which is represented by the maximum amplitude components and indicates in digital form the frequency of that maximum amplitude component. Since maximum of set logic techniques are well known in the digital computer art, they are not described in detail herein. The programmable synthesizer also provides a digital number corresponding to the frequency of the output which is applied to the mixer during each frequency increment. These frequencies are subtracted from the number indicating the maximum frequency of the entire spectral response in a subtraction logic network 36. The output of the subtraction logic is displayed and may be utilized in a computer. This output directly indicates the frequency $F_x$. The foregoing follows from the utilization of the difference output from the balanced mixer 12 (viz. $F_{IF}=F_{SYNTH}-F_x$). By subtracting the number corresponding to the synthesizer output, $f_{SYNTH}$, from the number corresponding to the IF frequency, $F_{IF}$, as appears from the output of the logic 34, the result is the maximum power frequency of the pulse $F_x$ directly.

The Fourier components relating to the amplitude of the fundamental frequency of each increment across the spectral response is applied to a digital-to-analog converter 40. The analog outputs may then be supplied to the vertical deflection plates of a cathode ray oscilloscope 42 and the oscilloscope steps across the horizontal width of the screen incrementally at each interval when a different local oscillator frequency is applied to the mixer by the synthesizer. These intervals occur synchronously with the clock pulses $T_5$ which step the synthesizer 14. Thus, vertical lines will appear on the cathode ray oscilloscope screen and the envelope of such lines will be a trace of the main lobe of the spectral response of the microwave pulses. A display 44, such as digitally controlled indicating tubes, connected to the output of the subtraction logic 36, may be used to provide the frequency $F_x$ directly. The cathode ray oscilloscope displays panoramically the power spectrum of the microwave pulse. Thus, the system simultaneously provides the frequency at which the microwave pulse has its maximum power and the power spectral density distribution of the microwave pulse. Alternatively, the information as to the Fourier transform over the increment containing the maximum power frequency $F_x$ may be applied to a digital plotter 33 and the spectrum displayed by the graph drawn by the plotter.

For measurement of peak power of the RF pulses automatically, another logic system 35 similar to the system 34 provides a digital output corresponding to the peak power level of the frequency $F_x$ at which the pulse maximum power is measured. This information is read out of the FFT computer 32 during each IF pulse interval such that the system 35 may operate independently of the system 34.

Average power over a specified bandwidth, say the bandwidth occupied by that portion of the main lobe of the response which has an amplitude exceeding the threshold $S_{TH}$, may be measured by an accumulator 37 into which the FFT computer 32 reads out the digital numbers representing the maximum power of the spectrum in each fine frequency increment (viz. the information obtained from each IF impulse). The output accumulation provides the average power (viz. the power over the bandwidth of the RF pulse) directly. This output may be read out into the plotter.

For short term frequency stability measurement, the plot of frequency $F_x$ may be examined visually, over a calibrated time period say one second, or automatically by a short term standard deviation computer 39 which solves the following equation:

$$\sigma = \pm \sqrt{\sum_{F_{x1}}^{F_{xn}} \frac{\Delta^2}{n-1}}$$

where
$\sigma$ = 1-second short term stability of $F_x$ = the standard deviation (unbiased) of the 1-second readings of frequency $F_{x1}$ to $F_{xn}$ around the best fitting least-squares curve ($C$) which in this case of drifting oscillators is known to be a straight line;
$F_{xn}$ = 1-second measured readings of $F_x$ (statistically known as the "observed" readings);
$t$ = universe time (statistically, $t$ is the "independent variable" or "argument");
$n$ = finite number (statistically large, i.e. approximately 100) of 1-second readings $F_{xn}$;
$\Delta t$ = calibrated time period between measured readings $F_{xn}$ = 1-second;
$(n-1)$ = finite number of 1-second time periods $\Delta t$;
$C$ = computed best fitting least-squares curve (known in statistics as the "regression line");
$F_{Cn}$ = computed values of $F_x$ on the curve $C$ corresponding to the measured values $F_{xn}$;
$S$ = computed slope of curve $C$ (known in statistics as the "regression coefficient")

$$=\frac{\Delta F_{Cn}}{\Delta t}$$

Figure 3:
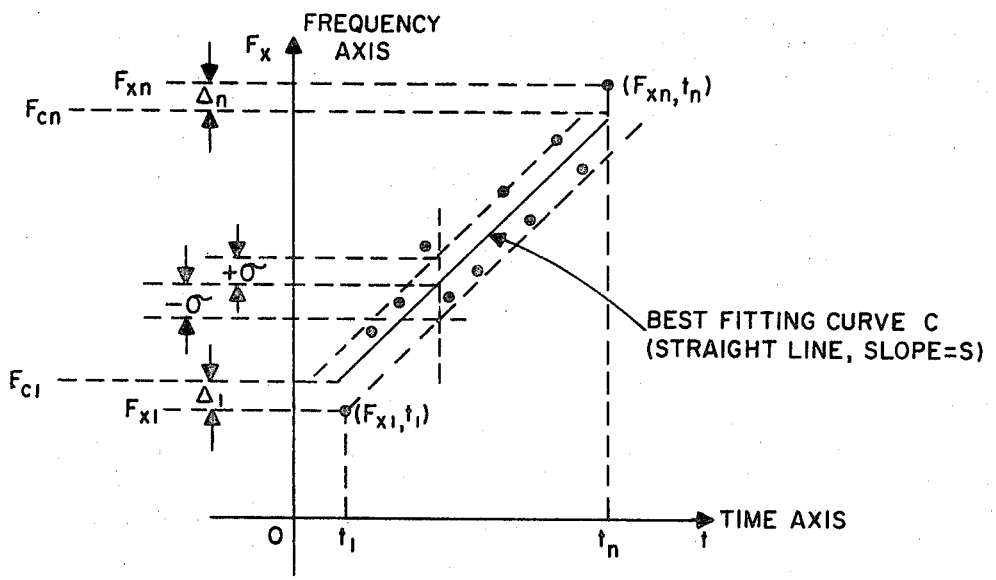
FIG. 3 is a graph showing successive digital readings of the center frequency of a microwave pulse and the short term stability (in terms of standard deviation) as measured and computed by means of the system shown in FIG. 1.

$\Delta$ = difference between measured frequencies $F_{x1}$ to $F_{xn}$ and corresponding computed frequencies $F_{C1}$ to $F_{Cn}$ (i.e. $\Delta_1 = F_{x1} - F$ $F_2 = F_{x2} - c_2$ The above definitions are illustrated in FIG. 3. Further details describing the least-squares curve technique (also known as a regression analysis) may be found in the "Handbook of Probability and Statistics with Tables" by Richard S. Burington et al. which was published by Handbook Publishers, Inc. Sandusky, Ohio (1953). An algorithm for the process of accomplishing the least-squares method of fitting the line $C$ to the readings $F_{x1}$ to $F_{xn}$ and computing the standard deviation $\sigma$ of the readings around the line $C$ can be found on pp. 25 to 28 of the IBM programming manual 0E-20-0205-2 previously referenced.

The clock $T_s$ determines the calibrated time period during which the readings are taken and the plotter 33 makes a recording of either the 1-second readings for visual examination, or the 100-second computed standard deviation, or both.

For long term frequency stability measurement (viz. frequency drift), the plot of frequency $F_x$ may be visually examined over a longer calibrated time period say 10 minutes, and the drift manually measured by subtracting the maximum power frequencies $F_x$ at the beginning and end of the 10-minute period and examining the plot between these end readings for evidence of gross instability. Of course, a clocked subtraction logic circuit may be used to perform the drift subtraction computation automatically and the plotter makes a recording of either 1-second readings for visual examination, or 10-minute computed drift, or both.

Thus, the plotter 33 makes a simultaneous recording of all measurements which may include peak pulse power, average power in a specified bandwidth, short term stability 1-second frequency readings, short term stability computed 100-second standard deviation, longterm stability 1-second or 1-minute frequency readings, and long term stability computed 10-minute drift.

The pulse-to-pulse phase coherence (viz. successive pulse-to-pulse phase difference) may be measured by means of a maximum of sets logic system 45 and a store- and-subtract system made up of a memory 46 and subtraction logic 50. The logic 45, which is timed by the clock pulses $T_4$ to act simultaneously with maximum of sets logic 34 for frequency components, identifies the digital numbers of all of the phase numbers which come out of the Fourier transform computer 32 which is represented by the maximum amplitude components and indicates in digital form the phase of that maximum amplitude component of frequency $F_x$. The digital store- and-subtract system contains two storage registers in its memory 46. The subtraction logic 50 is timed by $T_4$ to strobe simultaneously with the maximum of sets logic 34 for frequency information so as to store successive digital phase numbers in the registers and subtract these numbers, thus providing phase difference numbers at the output of the store- and-subtract circuit 46. The digital phase numbers at the output of the subtraction logic 46 may be recorded by the plotter 33 and examined visually, over a calibrated time period say one second, or automatically by a standard deviation computer 47 which is clocked by $T_s$, the calibrated time period during which the phase difference readings are taken, and the plotter 33 makes a recording of either the 1-second readings for visual examination, or 100-second computed standard deviation, or both.

From the foregoing description it will be apparent that there has been provided a system for automatically determining the frequency and power spectrum of a microwave pulse signal. The system is amenable to computer control and utilizes digital techniques, thus enhancing its reliability and accuracy. While an illustration embodiment of the system is described for purposes of illustrating the invention, it will be appreciated that variations and modifications thereof will become apparent to those skilled in the art. Accordingly, the description should be taken merely as illustrative and not in any limiting sense.

I claim:

1. An electronic measurement system for measuring the spectral characteristics of radio frequency pulse signals comprising:
   a. means for providing successive first words of digital information each work representing the amplitude and frequency characteristics of the pulse signal over a successive increment of its special response characteristic;
   b. means for repeatedly deriving output words of digital information respecting the Fourier spectrum components of the signal for each of said increments in response to said first words of digital information;
   c. means for analyzing said output digital information to indicate the characteristics of said pulse signal; and
   d. wherein said analyzing means comprises:
      1. means for deriving the Fourier spectrum component frequency having maximum power; and
      2. means for indicating or otherwise utilizing such Fourier spectrum component.

2. The invention as set forth in claim 1 wherein said means for deriving said maximum power Fourier frequency components includes a maximum of sets logic system to which said output digital information is applied for selecting from said output information the digital number which represents the one of said components having maximum amplitude.

3. The invention as set forth in claim 2 including means responsive to said digital number for deriving an output representing the standard frequency deviation of said component having maximum amplitude.

4. An electronic measurement system for measuring the spectral characteristics of radio frequency pulse signals comprising:
   a. means for providing successive first words of digital information each word representing the amplitude and frequency characteristics of the pulse signal over a successive increment of its spectral response characteristic;
   b. means for repeatedly deriving output words of digital information respecting the Fourier spectrum components of the signal for each of said increments in response to said first words of digital information;
   c. means for analyzing said output digital information to indicate the characteristics of said pulse signal; and
   d. wherein said analyzing means comprises:
      1. means for providing from said output information digital numbers representing the maximum power of the spectrum in each of said increments; and
      2. means for deriving which of said numbers is the greatest.

5. The invention as set forth in claim 4 including accumulator means for storing said digital numbers and providing an output number representing the average power over said spectral responsive characteristic.

6. An electronic measurement system for measuring the spectral characteristics of radio frequency pulse signals comprising:
   a. means for providing successive first words of digital information each word representing the amplitude and frequency characteristics of the pulse signal over a successive increment of its spectral response characteristic;
   b. means for repeatedly deriving output words of digital information respecting the Fourier spectrum components of the signal for each of said increments in response to said first words of digital information;
   c. means for analyzing said output digital information to indicate the characteristics of said pulse signal; and
   d. wherein said analyzing means includes:
      1. digital-to-analog conversion means for converting said output information words each of which represent the maximum amplitude frequency component in different ones of said increments into analog outputs corresponding to the amplitude thereof; and
      2. means for displaying said analog outputs graphically depicting said spectral response characteristic.

7. An electronic measurement system for measuring the spectral characteristics of radio frequency pulse signals comprising:
   a. means for providing successive first words of digital information each word representing the amplitude and frequency characteristics of the pulse signal over a successive increment of its spectral response characteristic;
   b. means for repeatedly deriving output words of digital information respecting the Fourier spectrum components of the signal for each of said increments in response to said first words of digital information;
   c. means for analyzing said output digital information to indicate the characteristics of said pulse signal; and
   d. wherein said analyzing means comprises:
      1. means for deriving from said outputs digital numbers representing the phase of the Fourier spectrum component having maximum amplitude; and
      2. means for storing said numbers representing the phase of the Fourier spectrum component having maximum amplitude of at least two successive pulse signals and deriving another number corresponding to the difference therebetween for deriving the phase coherence of said pulse signals.

8. The invention as set forth in claim 7 including means responsive to the numbers corresponding to said difference for deriving the standard deviation of said phase coherence.

9. An electronic measurement system for measuring the spectral characteristics of radio frequency pulse signals comprising:
   a. means for providing successive first words of digital information each word representing the amplitude and frequency characteristics of the pulse signal over a successive increment of its spectral response characteristic;

b. means for repeatedly deriving output words of digital information respecting the Fourier spectrum components of the signal for each of said increments in response to said first words of digital information;
c. means for analyzing said output digital information to indicate the characteristics of said pulse signal; and
d. wherein said digital information providing means includes:
1. a synthesizer for generating local signals which are variable in discrete frequency steps;
2. a down-converter responsive to said pulse signals and said local signals for providing intermediate frequency impulses in each of said steps; and
3. analog-to-digital conversion means for translating each of said impulses into a plurality of digital number for providing said digital information.

10. The invention as set forth in claim 9 including:
a. power detection means responsive to the power level of said impulses for providing a control signal when said level exceeds a given threshold; and
b. means included in said synthesizer responsive to said control signal for reducing the increments between said steps from relatively coarse to relatively fine increments when said threshold is exceeded.

11. The invention as set forth in claim 9 wherein said analog-to-digital conversion means includes:
a. a sample and hold circuit to which said impulses are applied;
b. means for operating said circuit to sample said impulses at a rate at least twice the intermediate frequency; and
c. an analog-to-digital converter responsive to each of said held samples from said circuit for translating each said sample into a digital number.

12. A system for analyzing the spectral response characteristic of radio frequency pulses comprising:
a. programmable frequency synthesizer for producing local output signals which change in discrete frequency steps;
b. a mixer;
c. means for applying the output of said synthesizer and the RF pulses to said mixer for deriving intermediate frequency impulses;
d. means for converting such intermediate frequency impulses into digital form;
e. means for computing from the information provided by said last named means digital outputs corresponding to the frequency having the maximum power of each of said intermediate frequency impulses;
f. means for providing from said synthesizer a digital number corresponding to the frequency of each of said signals applied from said synthesizer to said mixer; and
g. means for subtracting the digital number from said last named means from the digital output corresponding to said intermediate frequency impulses for producing an output representing the frequency of said impulses having maximum power.